United States Patent
Wang et al.

(10) Patent No.: US 10,769,770 B2
(45) Date of Patent: Sep. 8, 2020

(54) QUALITY MONITORING SYSTEM AND QUALITY MONITORING METHOD FOR FUEL CELL MANUFACTURING LINE AND QUALITY MONITORING SYSTEM FOR MANUFACTURING LINE

(71) Applicant: CUMMINS ENTERPRISE LLC, Indianapolis, IN (US)

(72) Inventors: Honggang Wang, Clifton Park, NY (US); Todd Striker, Malta, NY (US); Matthew J. Alinger, Malta, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 222 days.

(21) Appl. No.: 15/972,853

(22) Filed: May 7, 2018

(65) Prior Publication Data
US 2019/0340747 A1    Nov. 7, 2019

(51) Int. Cl.
*G06T 7/00* (2017.01)
*H01M 8/10* (2016.01)
(Continued)

(52) U.S. Cl.
CPC ........ *G06T 7/0004* (2013.01); *G06F 16/2379* (2019.01); *G06F 16/285* (2019.01); *H01M 8/10* (2013.01); *H04N 7/18* (2013.01)

(58) Field of Classification Search
CPC . G06T 7/0004; G06F 16/2379; G06F 16/285; H01M 8/10; H04N 7/18
See application file for complete search history.

(56) References Cited

U.S. PATENT DOCUMENTS 3,819,352 A    6/1974   Pei
5,217,305 A    6/1993   Yamakawa et al.
(Continued)

OTHER PUBLICATIONS

Talbert et al., "Conductive Cooling of High-Power RIB Targets", Nuclear Physics A, vol. 701, Issue: 1-4, pp. 303-311, Apr. 22, 2002.
(Continued)

*Primary Examiner* — Leon Flores
(74) *Attorney, Agent, or Firm* — Barnes & Thornburg LLP

(57) ABSTRACT

Quality monitoring system and method for a fuel cell manufacturing line are disclosed. The system includes an image collection unit and a real-time quality control computer. The image collection unit is configured for generating a captured image of a surface of one fuel cell in the fuel cell manufacturing line. The computer is configured to receive the captured image and generate a set of feature vectors based on the captured image. The computer comprises a defect model repository comprising a defect detection model repository and a defect classification model repository, a defect detection module and a defect classification module. The defect detection module is configured to access the defect detection model repository and determine whether the fuel cell is defective based on the set of feature vectors and the defect detection model repository. The defect classification module is configured to access the defect classification model repository when the defect detection module determines the fuel cell is defective and determine a defect type of the defective fuel cell based on the set of feature vectors and the defect classification model repository.

27 Claims, 16 Drawing Sheets

(51) Int. Cl.
*H04N 7/18* (2006.01)
*G06F 16/28* (2019.01)
*G06F 16/23* (2019.01)

(56) References Cited

U.S. PATENT DOCUMENTS

| | | | |
|---|---|---|---|
| 7,748,259 | B2 | 7/2010 | Faidi et al. |
| 7,989,118 | B2 | 8/2011 | Bourgeois et al. |
| 8,654,920 | B2 | 2/2014 | Ahn et al. |
| 8,945,795 | B2 | 2/2015 | Berggren et al. |
| 9,234,843 | B2 | 1/2016 | Sopori et al. |
| 9,653,743 | B2 | 5/2017 | Ahn et al. |
| 9,784,625 | B2 | 10/2017 | Couse et al. |
| 2003/0184740 | A1 | 10/2003 | Paradis |
| 2010/0237524 | A1 | 9/2010 | Chen |
| 2012/0140880 | A1* | 6/2012 | Ahn ............... G01N 23/04 378/58 |
| 2014/0193064 | A1* | 7/2014 | Couse ............... G01N 21/8851 382/141 |
| 2015/0093661 | A1 | 4/2015 | Watanabe et al. |

OTHER PUBLICATIONS

Sparrow et al., "The Design of Cold Plates for the Thermal Management of Electronic Equipment", Heat Transfer Engineering, vol. 27, Issue: 07, pp. 6-16, 2006.

Aieta et al., "Applying Infrared Thermography as a Quality-Control Tool for the Rapid Detection of Polymer-Electrolyte-Nembrane-Fuel-Cell Catalyst-Layer-Thickness Variations", Journal of Power Sources, vol. 211, pp. 04-11, Aug. 1, 2012.

Perry., "Industry Developments: Cooling Solar Power Inverters", Advanced Thermal Solutions, retrieved from https://www.qats.com/cms/2016/11/21/industry-developments-cooling-solar-power-inverters/, retrieved on Nov. 3, 2017, pp. 01-08, Nov. 21, 2016.

Jang et al., "Electromechanical Diagnostic Method for Monitoring Cracks in Polymer Electrolyte Fuel Cell Electrodes", International Journal of Hydrogen Energy, vol. 42, Issue: 16, pp. 11644-11653, Apr. 20, 2017.

\* cited by examiner

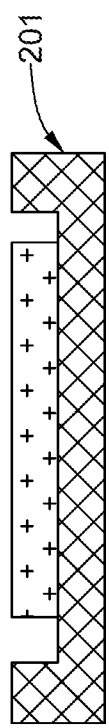
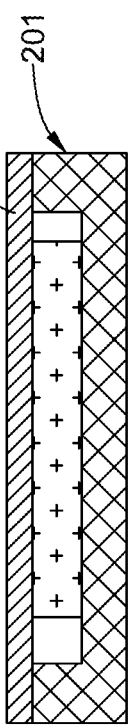
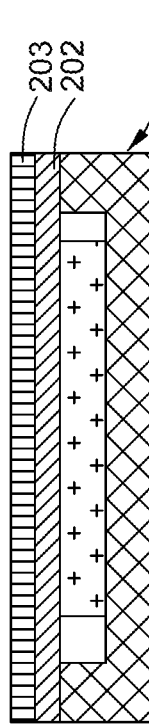
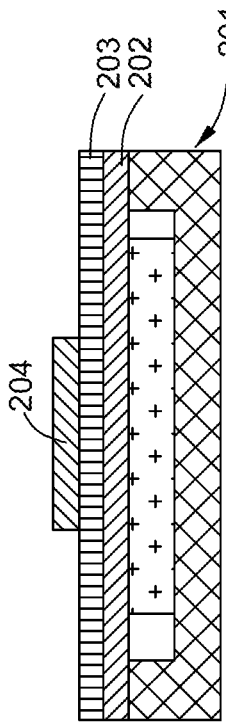
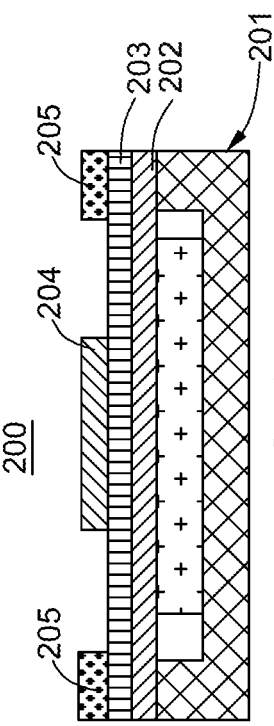
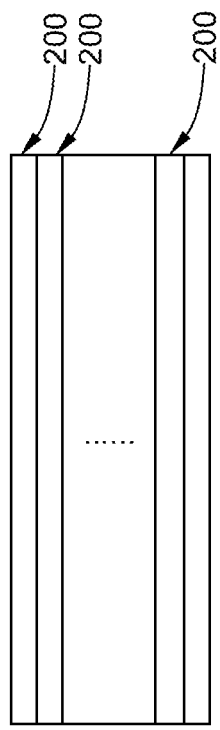
FIG. 2
FIG. 3
FIG. 4
FIG. 5
FIG. 6
FIG. 7

| Defect type before cathode deposition phase | Defect type before fuel cell stacking phase |
|---|---|
| Non-uniform surface preparation | Non-uniform coating |
| Debris | Incomplete coating |
| Coating defects | Print mis-alignment |
| Coating contaminant | |
| Delamination | |

FIG. 16

QUALITY MONITORING SYSTEM AND QUALITY MONITORING METHOD FOR FUEL CELL MANUFACTURING LINE AND QUALITY MONITORING SYSTEM FOR MANUFACTURING LINE

BACKGROUND

This disclosure relates generally to the field of fuel cells, and more particularly to quality monitoring systems and quality monitoring methods for a fuel cell manufacturing line, and a quality monitoring system for a manufacturing line.

Fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems are being widely developed as an energy supply system because fuel cells are environmentally superior and highly efficient. As single fuel cell can only generate voltages of about 1 V, therefore, a plurality of fuel cells are usually stacked together (usually referred to as a fuel cell stack) to get a desired voltage.

Fuel cell manufacturing has a yield rate of about 90%. A fuel cell manufacturing line has multiple phases. During the multiple phases, there may be some defects in a manufactured fuel cell. These may include coating defects, debris, coating non-uniformity, incomplete coating coverage, contamination, mis-alignment of coatings, etc. At present, a human visual inspection is usually used for the defects checking in the fuel cell manufacturing line. However, the human visual inspection would depend on people's experience and knowledge to a large degree. Thus, the human visual inspection would have high requirement for operators and need a long time to train the operators well, which would cause high labor costs. Furthermore, the human visual inspection could be prone to some human errors, which could cause lack of accuracy, consistency and reliability on the fuel cell quality control. The human visual inspection has low productivity and low efficiency.

Therefore, it is desirable to provide an improved quality monitoring solution to solve at least one of the above-mentioned issues.

BRIEF DESCRIPTION

In one aspect of embodiments of the present disclosure, a quality monitoring system for a fuel cell manufacturing line is provided. The quality monitoring system comprises an image collection unit and a real-time quality control computer. The image collection unit is configured for generating a captured image of a surface of one fuel cell in the fuel cell manufacturing line. The real-time quality control computer is coupled to the image collection unit and is configured to receive the captured image and generate a set of feature vectors based on the captured image. The real-time quality control computer comprises a defect model repository comprising a defect detection model repository and a defect classification model repository, a defect detection module and a defect classification module. The defect detection module is configured to access the defect detection model repository and determine whether the fuel cell is defective based on the set of feature vectors and the defect detection model repository. The defect classification module is configured to access the defect classification model repository when the defect detection module determines the fuel cell is defective and determine a defect type of the defective fuel cell based on the set of feature vectors of the defective fuel cell and the defect classification model repository.

In another aspect of embodiments of the present disclosure, a quality monitoring method for a fuel cell manufacturing line is provided. The quality monitoring method comprises generating, by a first image collection unit, a captured first image of a surface of one fuel cell in one phase of the fuel cell manufacturing line; generating a set of feature vectors based on the captured first image; and accessing a defect model repository and generating a quality detection result of the fuel cell based on the set of feature vectors and the defect model repository. Accessing the defect model repository and generating the quality detection result of the fuel cell comprises: accessing a defect detection model repository of the defect model repository; determining whether the fuel cell is defective based on the set of feature vectors and the defect detection model repository; when the fuel cell is determined to be defective, accessing a defect classification model repository of the defect model repository; and determining a defect type of the defective fuel cell based on the set of feature vectors of the defective fuel cell and the defect classification model repository, In still another aspect of embodiments of the present disclosure, a quality monitoring system for a manufacturing line is provided. The quality monitoring system comprises an image collection unit for generating a captured image of a surface of a manufactured item in the manufacturing line, and a real-time quality control computer coupled to the image collection unit and configured to receive the captured image and generate a set of feature vectors based on the captured image. The real-time quality control computer comprises a defect model repository comprising a defect detection model repository and a defect classification model repository; a defect detection module and a defect classification module. The defect detection module is configured to access the defect detection model repository and determine whether the manufactured item is defective based on the set of feature vectors and the defect detection model repository. The defect classification module is configured to access the defect classification model repository when the defect detection module determines the manufactured item is defective and determine a defect type of the manufactured item based on the set of feature vectors of the manufactured item and the defect classification model repository.

DRAWINGS

These and other features, aspects, and advantages of the present disclosure will become better understood when the following detailed description is read with reference to the accompanying drawings in which like characters represent like parts throughout the drawings, wherein:

FIGS. 2-6 are cross-sectional views of fuel cells manufactured at individual phases of FIG. 1;

FIG. 7 illustrates a fuel cell stack manufactured according to FIG. 1;

FIG. 16 is a table illustrating defect types of the fuel cell at certain phases of the fuel cell manufacturing line;

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including", "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Fuel Cell Manufacturing

Figure 1:
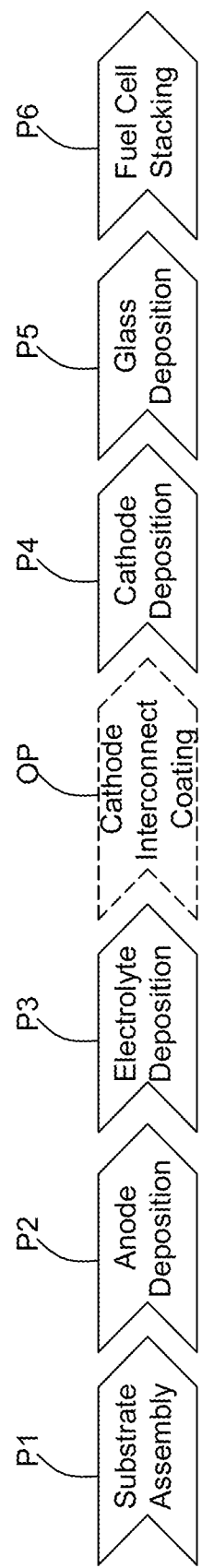
FIG. 1 is a process flow diagram of a fuel cell manufacturing line.

FIG. 1 illustrates a process flow of a fuel cell manufacturing line, FIGS. 2-6 illustrate cross-sectional views of fuel cells manufactured at individual phases of the fuel cell manufacturing line of FIG. 1, and FIG. 7 illustrates a fuel cell stack manufactured according to FIG. 1. As shown in FIG. 1, the fuel cell manufacturing line may include a substrate assembly phase P1, an anode deposition phase P2, an electrolyte deposition phase P3, a cathode deposition phase P4, a glass deposition phase P5 and a fuel cell stacking phase P6.

At the substrate assembly phase P1, as shown in FIG. 2, a bipolar stainless-steel metal substrate 201 is formed using stamping, punching, brazing or welding, or combinations thereof, to integrate both anode and cathode flow fields and interconnects. The bipolar metal substrate 201 also supports a porous metallic membrane, consisting of a screen, a foam, a sintered thick film, a thick film deposited using non-sintered methods, or combinations thereof, attached in fluid contact with the anode flow field by using brazing, welding, diffusion, or compression bonding.

At the anode deposition phase P2, as shown in FIG. 3, a surface of the metal substrate 201 is cleaned to allow for sufficient anode adhesion to the metal surface. An anode electrode layer 202 is then deposited for example by using thermal spray techniques. The anode electrode layer 202 fully covers permeable metallic membrane in FIG. 2.

At the electrolyte deposition phase P3, as shown in FIG. 4, an electrolyte layer 203 is deposited for example by using thermal spray techniques. The electrolyte layer 203 fully covers the anode electrode layer 202 to form a seal over the anode flow field, which can prevent fluid communication between the anode flow field and the cathode flow field during fuel cell operation. One skilled in the art of fuel cell manufacturing can appreciate that additional electrolyte layers can be added to prevent chemical reaction between the electrolyte layer 203 and a cathode layer 204 during the fuel cell operation.

Optionally, returning to FIG. 1, the fuel cell manufacturing line may further include a cathode interconnect coating phase OP between the electrolyte deposition phase P3 and the cathode deposition phase P4. At the cathode interconnect coating phase OP, a coating is applied to exposed cathode interconnect stainless steel metal to prevent chromium volatilization during the fuel cell operation. One skilled in the art of fuel cell manufacturing can appreciate that alternative metal materials can be used that do not volatilize chromium during the fuel cell operation. One skilled in the art of fuel cell manufacturing can also appreciate that a cathode interconnect coating can be applied instead at other phases in the fuel cell manufacturing line, such as between the substrate assembly phase P1 and the anode deposition phase P2, or between the anode deposition phase P2 and the electrolyte deposition phase P3, or between the cathode deposition phase P4 and the glass deposition phase P5.

At the cathode deposition phase P4, as shown in FIG. 5, a cathode paste 204, i.e. a cathode layer 204, is applied to the electrolyte layer 203 in electrochemically active areas for example by using wet powder spray or screen printing techniques. The cathode paste 204 is dried to form a "green" coating that has sufficient adhesion strength. One skilled in the art of fuel cell manufacturing can appreciate that additional cathode layers can be added to optimize ionic and/or electronic conductivity and mass transport properties.

At the glass deposition phase P5, as shown in FIG. 6, a glass paste 205 is applied to the surface of the electrolyte layer 203 around manifold perimeters to form a seal during the fuel cell operation between adjacent manifold couplings. The glass paste 205 is dried to form a "green" coating that has sufficient adhesion strength. Additionally, the glass can be disposed onto the electrolyte layer 203 using a green tape fabricated using tape casting methods.

The above phases occur in series, P1 through P5, and result in a minimum electrochemical repeat unit, also named as a finished fuel cell 200, that at which, upon the fuel cell stacking and operation is considered to be the electrochemical repeat unit that incrementally increases the stack voltage during the fuel cell operation.

At the fuel cell stacking phase P6, as shown in FIG. 7, FIG. 7 shows the only component necessary to construct the electrochemical functionality of the fuel cell stack is the finished fuel cell 200. The finished fuel cells 200 are stacked on the top of one another, without the need for additional materials, to form a "fuel cell stack" which contain at least two finished fuel cells 200.

All of the phases above, with the exception of the cathode interconnect coating phase OP, are a representation of those minimum steps needed to create a sequentially manufactured metal-supported fuel cell stack. However, one skilled in the art of fuel cell processing can appreciate that additional phases may be used to improve fuel cell performance during the fuel cell operation.

Quality Monitoring System

Figure 9:
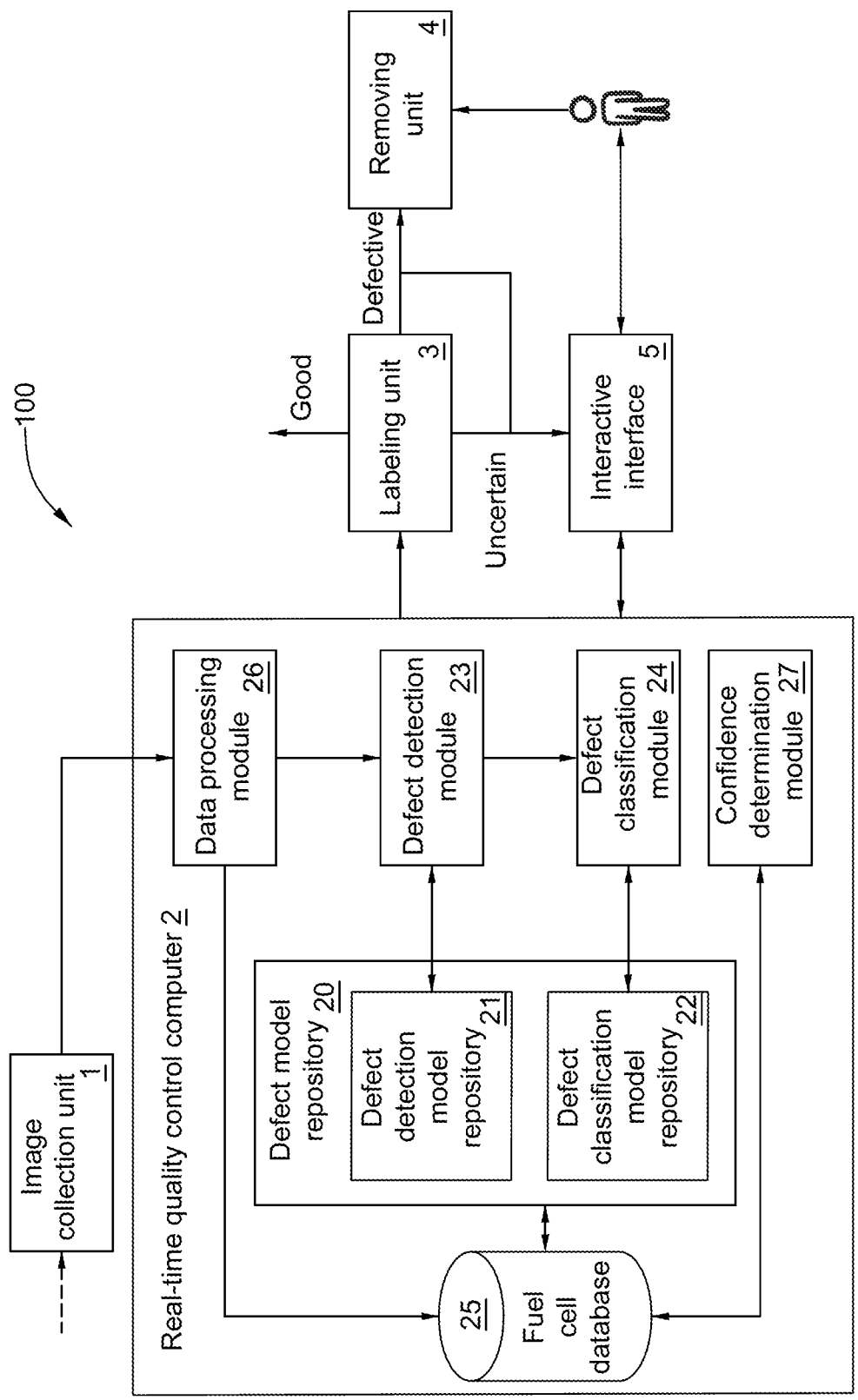
FIG. 9 is a schematic diagram of a quality monitoring system for a fuel cell manufacturing line in accordance with an embodiment of the present disclosure.

FIG. 9 illustrates a schematic diagram of a quality monitoring system 100 in accordance with an embodiment of the present disclosure. The quality monitoring system 100 may be used for the fuel cell manufacturing line of FIG. 1. As shown in FIG. 9, the quality monitoring system 100 may include an image collection unit 1 and a real-time quality control computer 2. The image collection unit 1 may include but not limited to a camera. The image collection unit 1 may be located at one or more phases of the fuel cell manufacturing line of FIG. 1, and may capture an image of a surface of one fuel cell in the fuel cell manufacturing line. The real-time quality control computer 2 is coupled to the image collection unit 1 and includes a defect model repository 20. The image collection unit 1 may transfer the captured image to the real-time quality control computer 2 via a wireless method, a data cable, an optical fiber or a private cloud. The real-time quality control computer 2 may receive the captured image and generate a set of feature vectors based on the captured image, access the defect model repository 20, and generate a quality detection result of the fuel cell based on the set of feature vectors and the defect model repository 20.

It should be understood that the term "fuel cell" mentioned in the present disclosure should have a broad explanation, and it could include unfinished, and finished products manufactured at all the phases before the fuel cell stacking. The fuel cell 200 specifically includes a finished fuel cell that is directly and solely used to construct a fuel cell stack.

In one embodiment, the defect model repository 20 may include a defect detection model repository 21 and a defect classification model repository 22. The defect detection model repository 21 may have one or more models to determine whether the fuel cell is defective. The defect classification model repository 22 may also have one or more models to determine one or more defect types presented in the fuel cell manufacturing line.

The real-time quality control computer 2 may include a defect detection module 23 and a defect classification module 24. The defect detection module 23 may access the defect detection model repository 21 and determine whether the fuel cell is defective based on the set of feature vectors generated and the defect detection model repository 21. The defect classification module 24 may access the defect classification model repository 22 when the defect detection module 23 determines the fuel cell is defective and determine a defect type of the defective fuel cell based on the set of feature vectors of the defective fuel cell and the defect classification model repository 22.

The real-time quality control computer 2 may further include a fuel cell database 25 and a data processing module 26. The fuel cell database 25 may store fuel cell related data. The data processing module 26 may process the captured image to generate the set of feature vectors and the processed data including the set of feature vectors may be saved in the fuel cell database 25.

With continued reference to FIG. 9, the quality monitoring system 100 may further include a labeling unit 3. The labeling unit 3 may label the fuel cell with the quality detection result of the fuel cell generated by the real-time quality control computer 2. For example, in one embodiment, the labeling unit 3 may label the quality detection result of the fuel cell at a different terminal from an identifier number of the fuel cell. In another embodiment, the labeling unit 3 may combine the quality detection result of the fuel cell with the identifier number of the fuel cell together in a QR code, or a data matrix code, or other protocols that are familiar to those skilled in the art of manufacturing.

When the quality detection result indicates that the fuel cell is good, the labeling unit 3 labels the fuel cell as good and the good fuel cell may be return to the next phase of the fuel cell manufacturing line. When the quality detection result indicates that the fuel cell is defective, the labeling unit 3 labels the fuel cell as the determined defect type and the defective fuel cell may be removed from the current phase of the fuel cell manufacturing line. When the quality detection result indicates that quality of the fuel cell is uncertain, i.e. the real-time quality control computer 2 cannot determine quality of the fuel cell, the labeling unit 3 labels the fuel cell as uncertain.

The quality monitoring system 100 may further include a removing unit 4. The removing unit 4 may remove a defective fuel cell from the fuel cell manufacturing line.

The quality monitoring system 100 may further include an interactive interface 5. The real-time quality control computer 2 has self-learning mechanism and may learn interactively with a field operator via the interactive interface 5.

The real-time quality control computer 2 may further include a confidence determination module 27. The confidence determination module 27 may determine a confidence value of the defect model repository 20 which are indicative of reliability of the defect model repository 20. When the real-time quality control computer 2 determines the fuel cell is defective and the confidence value of the defect model repository 20 is above a threshold, the removing unit 4 removes the defective fuel cell from the fuel cell manufacturing line. However, when the confidence value of the defect model repository 20 drops below the threshold, even if the real-time quality control computer 2 determines the fuel cell is defective, the defective fuel cell won't be removed from the fuel cell manufacturing line. Under this circumstance, the labeling unit 3 labels the fuel cell as uncertain and notifies the field operator via the interactive interface 5. Then, quality of the uncertain fuel cell will be confirmed by the field operator. Furthermore, when the confidence value of the defect model repository 20 drops below the threshold, the defect model repository 20 is updated with the set of feature vectors generated.

The confidence determination module 27 may determine the confidence value of the defect model repository 20 based on historical determining results of the real-time quality control computer 2 and historical confirming results of the field operator.

When the number of defective fuel cells accumulated in the fuel cell database 25 and confirmed by the field operator reaches a limit, the defect model repository 20 is updated with sets of feature vectors generated from images of the defective fuel cells.

A deviation between the defect model repository 20 and the fuel cell manufacturing line may exist. This deviation may be caused by the external factors and/or internal factors. External factors may comprise change of raw material and environmental variables. Internal factors may comprise natural aging or degradation of part, subsystem in the fuel cell manufacturing line. The confidence determination module 27 provides a mean to monitor this deviation and update the defect model repository 20 when this deviation exceeds a limit. In this way, the defect model repository 20 updates with the fuel cell manufacturing line and ensures a reliable prediction result for fuel cell manufacturing quality.

In the fuel cell manufacturing line of FIG. 1, the anode deposition phase P2 and the electrolyte deposition phase P3 use thermal spray techniques. The challenge of thermal spray is to form a substantially hermetic electrolyte coating to seal over the anode flow field, which can prevent fluid communication between the anode flow field and the cathode flow field during the fuel cell operation. Thus, it is preferable to apply one defect detection after electrolyte deposition and processing.

In addition, the most critical area of the fuel cell is also the "active" area of the fuel cell. The cathode deposition phase P4 covers the active area of the electrolyte layer 203 by wet powder spray or screen printing. Therefore, once the cathode layer 204 is applied to the electrolyte layer 204, both visual and fluid methods for detecting defects of the fuel cell are inhibited. Applying one detection before the cathode deposition phase P4 allows for the defect detection on the electrolyte layer.

Figure 10:
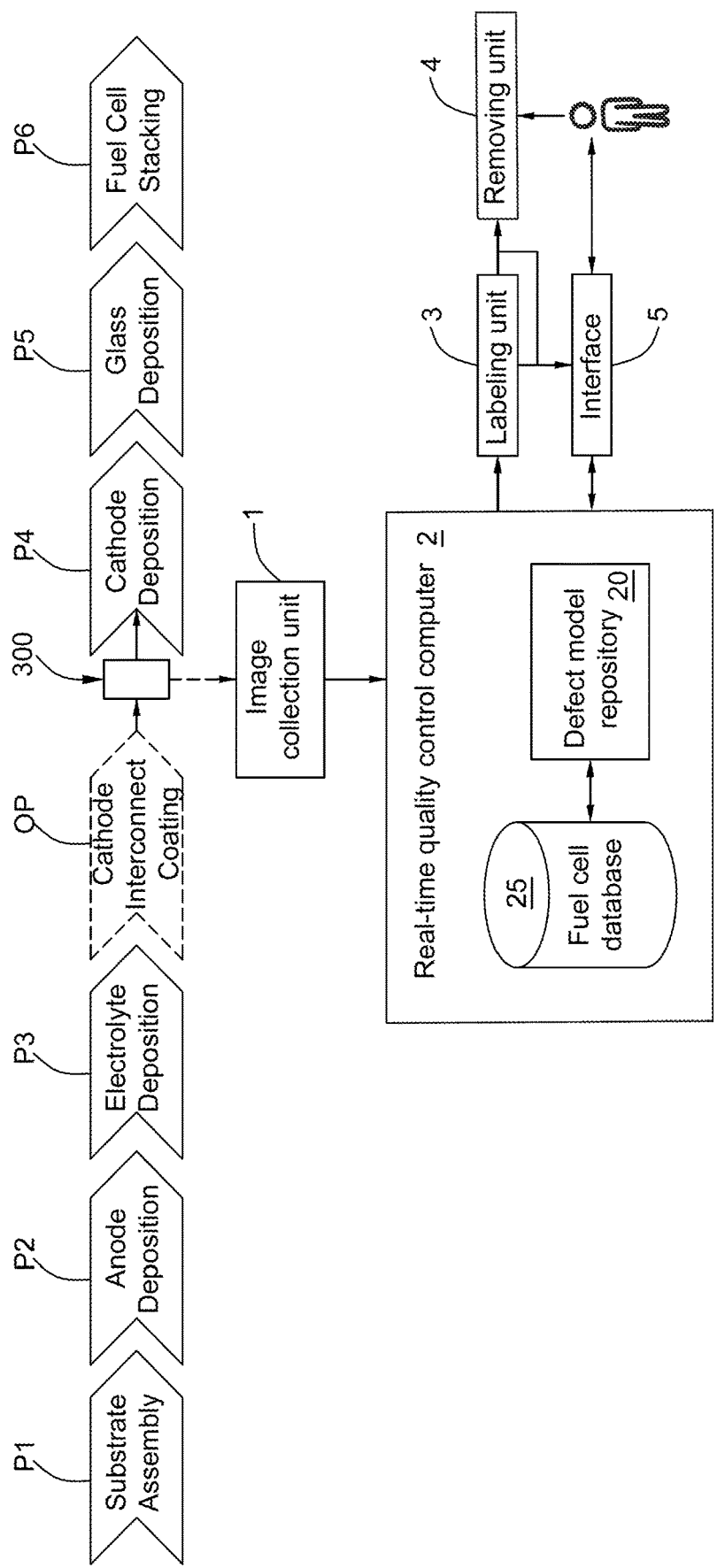
FIG. 10 is a schematic diagram illustrating one position of an image collection unit of the quality monitoring system located in the fuel cell manufacturing line.

Therefore, in one embodiment, as shown in FIG. 10, the image collection unit 1 of the quality monitoring system 100 may be located before the cathode deposition phase P4. The quality monitoring system 100 may be used for quality monitoring the fuel cell 300 (which is an unfinished cell in process) before the cathode deposition phase P4.

When the image collection unit 1 is located before the cathode deposition phase P4, the set of feature vectors generated by the real-time quality control computer 2 may include a first set of feature vectors. The first set of feature vectors are associated with one or more of part size, datum positions, flow field alignment, anode coating defects, electrolyte coating defects, color anomalies indicating contamination and uniformity of cathode interconnect coating.

Figure 11:
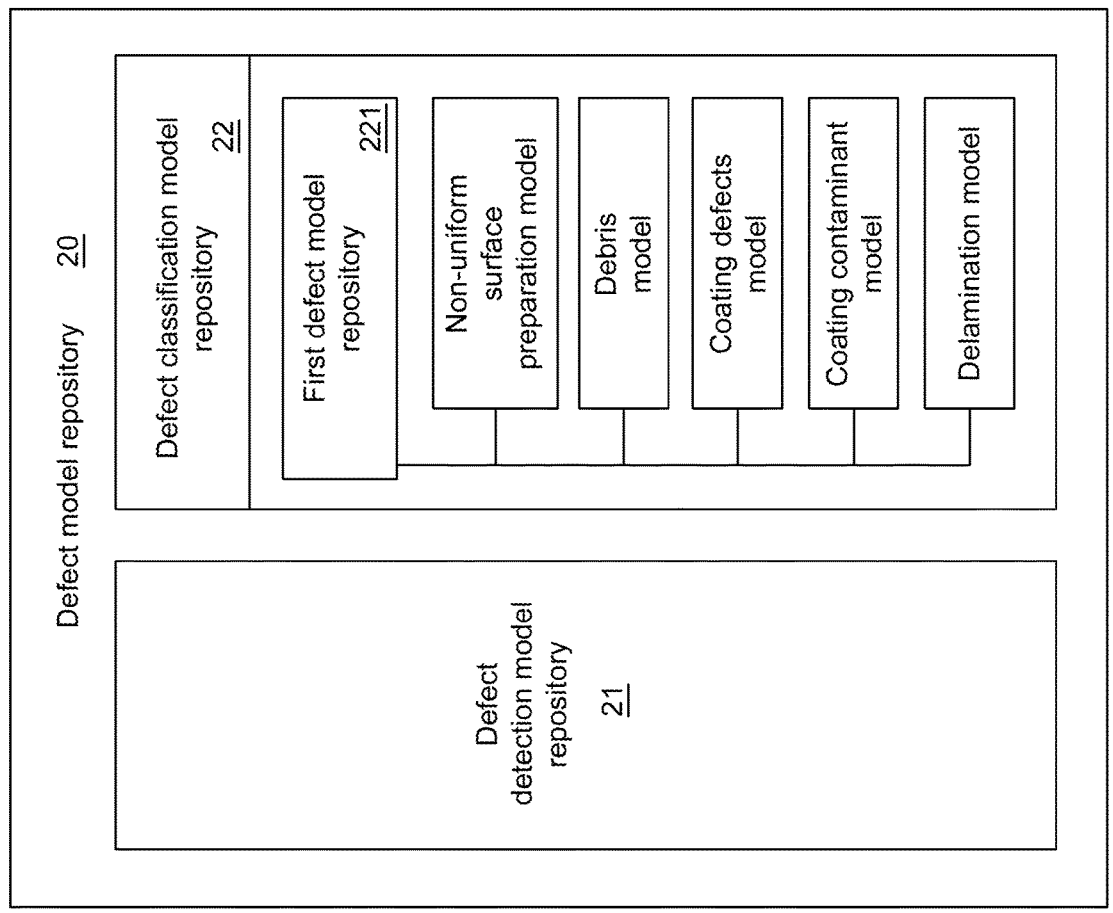
FIG. 11 is a schematic diagram of a defect model repository in the quality monitoring system of FIG. 10.

As shown in FIG. 11, the defect classification model repository 22 of the real-time quality control computer 2 in the quality monitoring system 100 may have a first defect model repository 221. The first defect model repository 221 may have one or more models to determine one or more defect types presented on a coating deposited at the phases of substrate assembly, electrolyte deposition, or combinations thereof. For example, with reference to FIG. 16, the defect types presented before the cathode deposition phase P4 may include non-uniform surface preparation, debris, coating defects, coating contaminant, delamination etc., and accordingly, the first defect model repository 221 may have a non-uniform surface preparation model, a debris model, a coating defects model, a coating contaminant model and a delamination model.

Defect detection of the fuel cell 200 prior to the fuel cell stacking allows for detection of all other defects. For instance, the flatness of the cell, the surface quality of the cathode, the surface quality of the cathode interconnect coating, etc., are all available for visual inspection.

Figure 12:
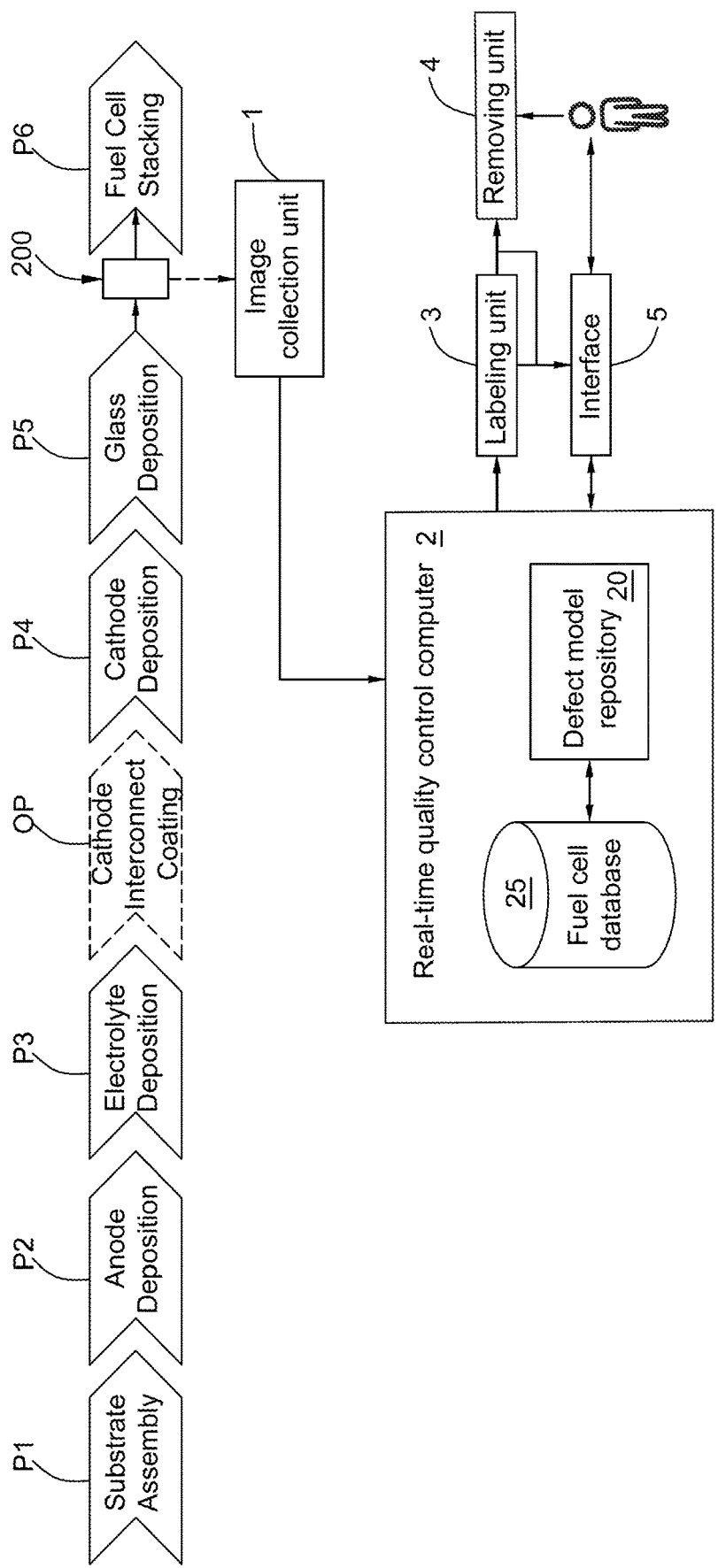
FIG. 12 is a schematic diagram illustrating another position of the image collection unit of the quality monitoring system located in the fuel cell manufacturing line.

Therefore, in another embodiment, as shown in FIG. 12, the image collection unit 1 of the quality monitoring system 100 may be located before the fuel cell stacking phase P6. In a preferred embodiment, the image collection unit 1 of the quality monitoring system 100 is located after the glass deposition phase P5 and before the fuel cell stacking phase P6, and the quality monitoring system 100 is used for quality monitoring the finished fuel cell 200 after the glass deposition phase P5 and before the fuel cell stacking phase P6. Therefore, the image collection unit 1 of the quality monitoring system 100 enables complete image collection and defect detection of the fuel cell 200 of the fuel cell stack. In yet another preferred embodiment, the fuel cell 200 is sequentially manufactured according to the phases occurring in series, P1 through P5 of FIG. 1. The fuel cell 200 resulting from the above phase P1-P5 occurring in series is only one component necessary to add to the fuel cell stack to increase operating voltage. Thus, in such the sequential fuel cell manufacturing process, only one image collection unit 1 is needed prior to the fuel cell stacking.

Figure 8:
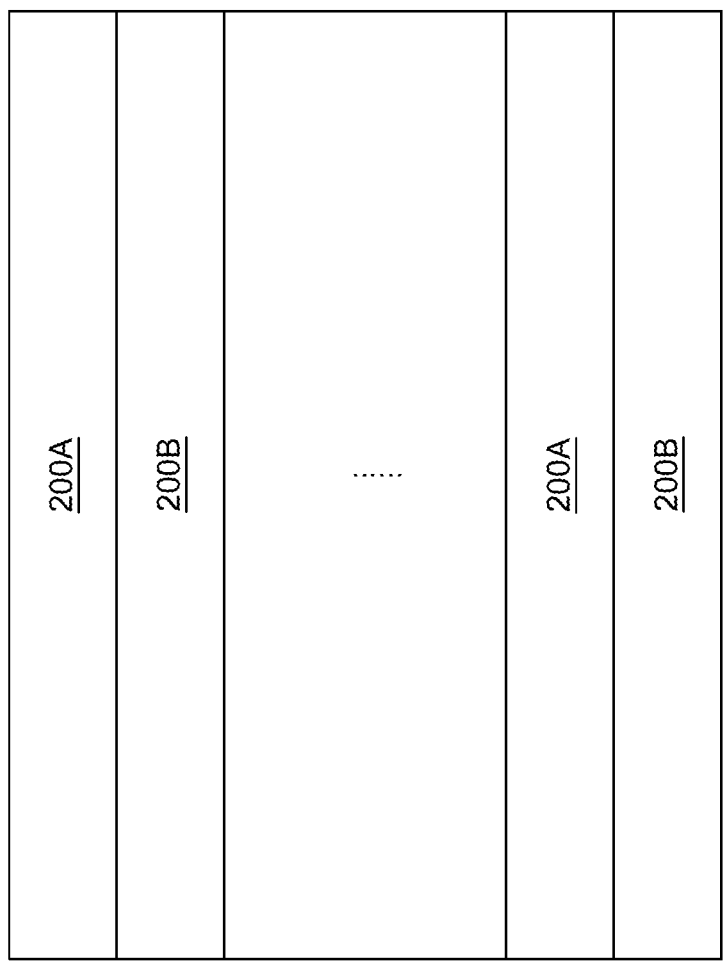
FIG. 8 illustrates a conventional fuel cell stack that requires multiple components to construct.

However, historically, the fuel cell stacking requires multiple components, such as: an electrochemical cell 200A consisting of an anode, electrolyte and cathode; and an interconnect 200B. FIG. 8 illustrates a conventional fuel cell stack that requires multiple components to construct. Two series of processes are required to produce the electrochemical cell 200A and the interconnect 200B in parallel. Thus, to get a complete visual inspection before the fuel cell stacking, historical fuel cell manufacturing would require two image collection units, one unit to detect defects of the electrochemical cell 200A prior to stacking, and one unit to detect defects of the interconnect 200B prior to stacking.

Therefore, in comparison to the historical fuel cell manufacturing, using the sequential fuel cell manufacturing process according to FIG. 1 needs only one image collection unit 1 prior to stacking to complete defect detection of the fuel cell 200.

When the image collection unit 1 is located before the fuel cell stacking phase P6, the set of feature vectors generated by the real-time quality control computer 2 may include a second set of feature vectors. The second set of feature vectors are associated with one or more of alignment of cathode, alignment of glass seal in reference to part perimeter and manifolds, uniformity of glass seal coverage and uniformity of cathode.

Figure 13:
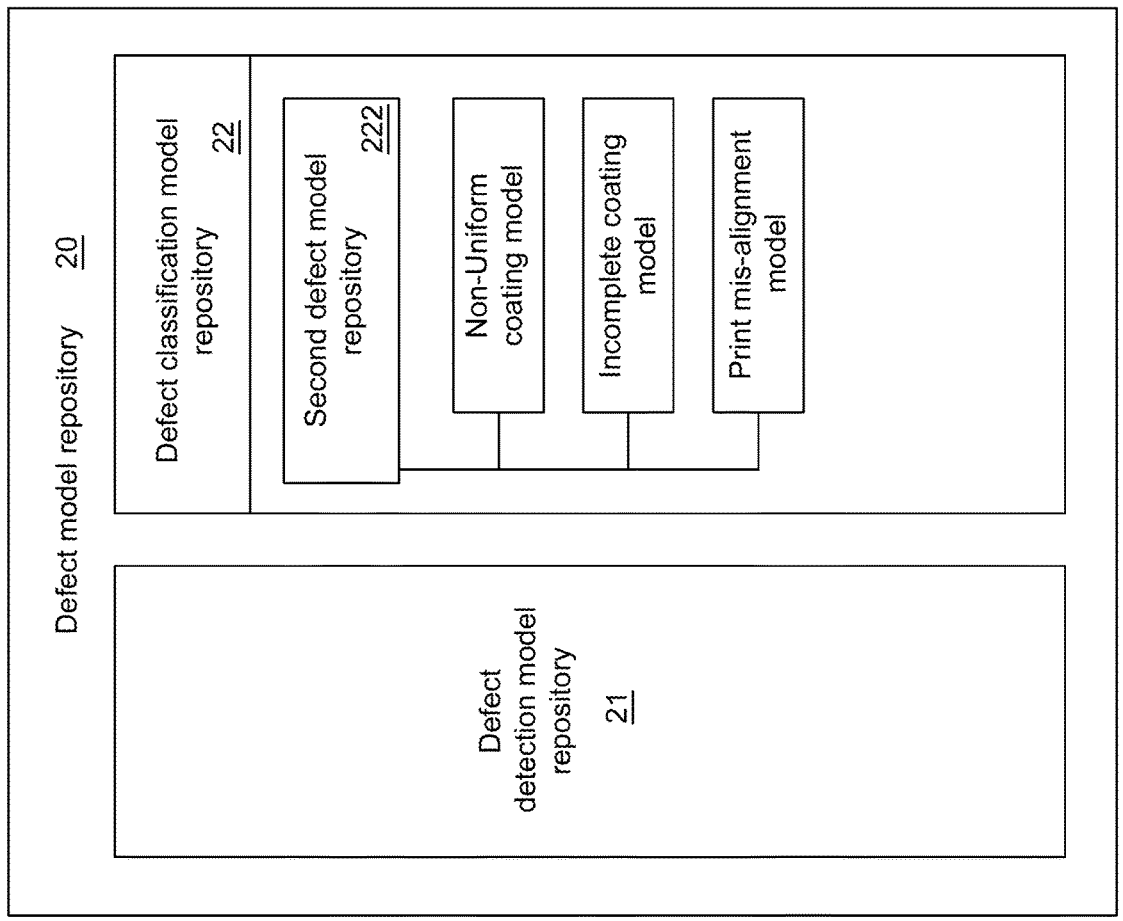
FIG. 13 is a schematic diagram of a defect model repository in the quality monitoring system of FIG. 12.

As shown in FIG. 13, the defect classification model repository 22 of the real-time quality control computer 2 in the quality monitoring system 100 may have a second defect model repository 222. The second defect model repository 222 may have one or more models to determine one or more defect types presented at the phases of cathode interconnect coating, cathode deposition, glass deposition or combinations thereof. For example, with reference to FIG. 16, the defect types presented before the fuel cell stacking phase P6 may include non-uniform coating, incomplete coating, print mis-alignment etc., and accordingly, the second defect model repository 222 has a non-uniform coating model, an incomplete coating model and a print mis-alignment model.

Figure 14:
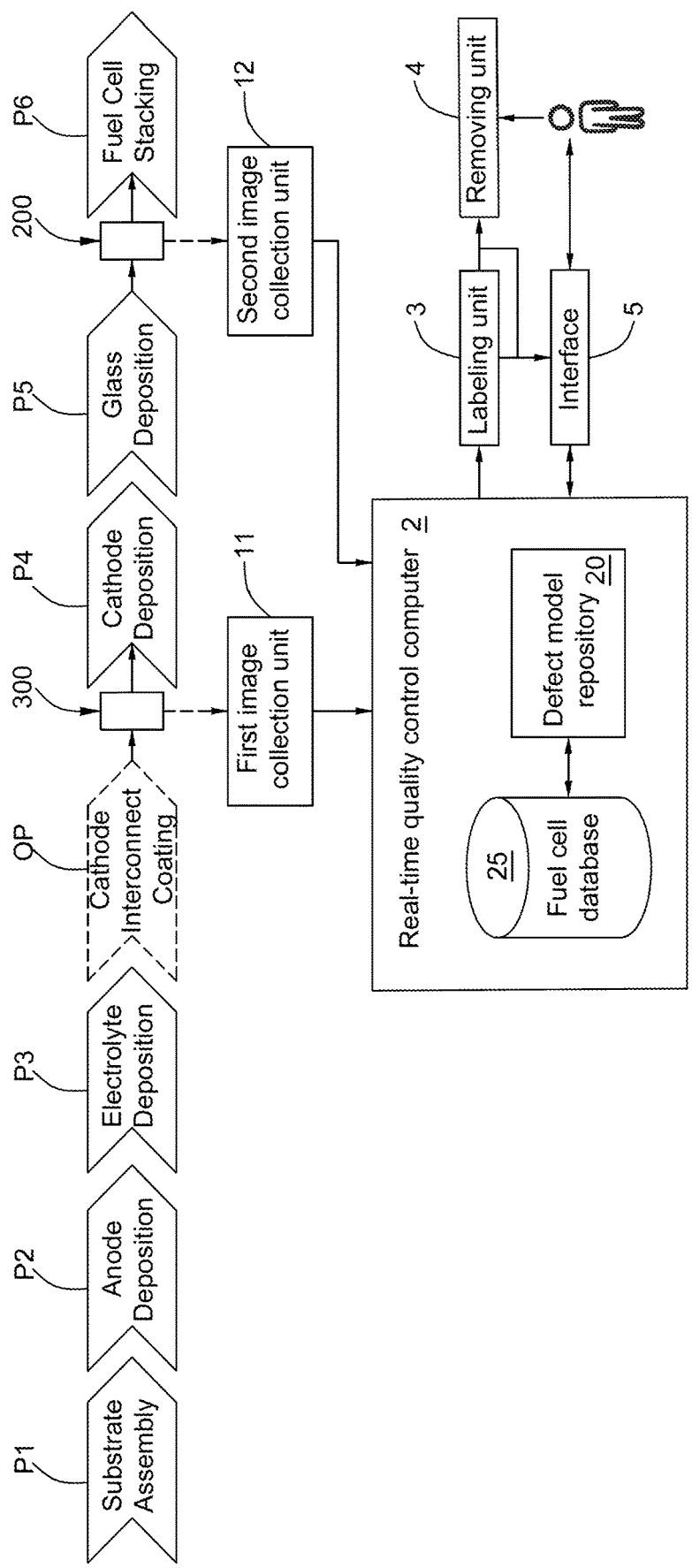
FIG. 14 is a schematic diagram illustrating still another position of the image collection unit of the quality monitoring system located in the fuel cell manufacturing line.

In still another embodiment, as shown in FIG. 14, the image collection unit 1 of the quality monitoring system 100 may include a first image collection unit 11 and a second image collection unit 12. The first image collection unit 11 may be located before the cathode deposition phase P4, and the second image collection unit 12 may be located before the fuel cell stacking phase P6. In a preferred embodiment, the second image collection unit 12 is located after the glass deposition phase P5 and before the fuel cell stacking phase P6. The quality monitoring system 100 is used for quality monitoring the unfinished fuel cell 300 before the cathode deposition phase P4 and the finished fuel cell 200 after the glass deposition phase P5 and before the fuel cell stacking phase P6 respectively.

Figure 15:
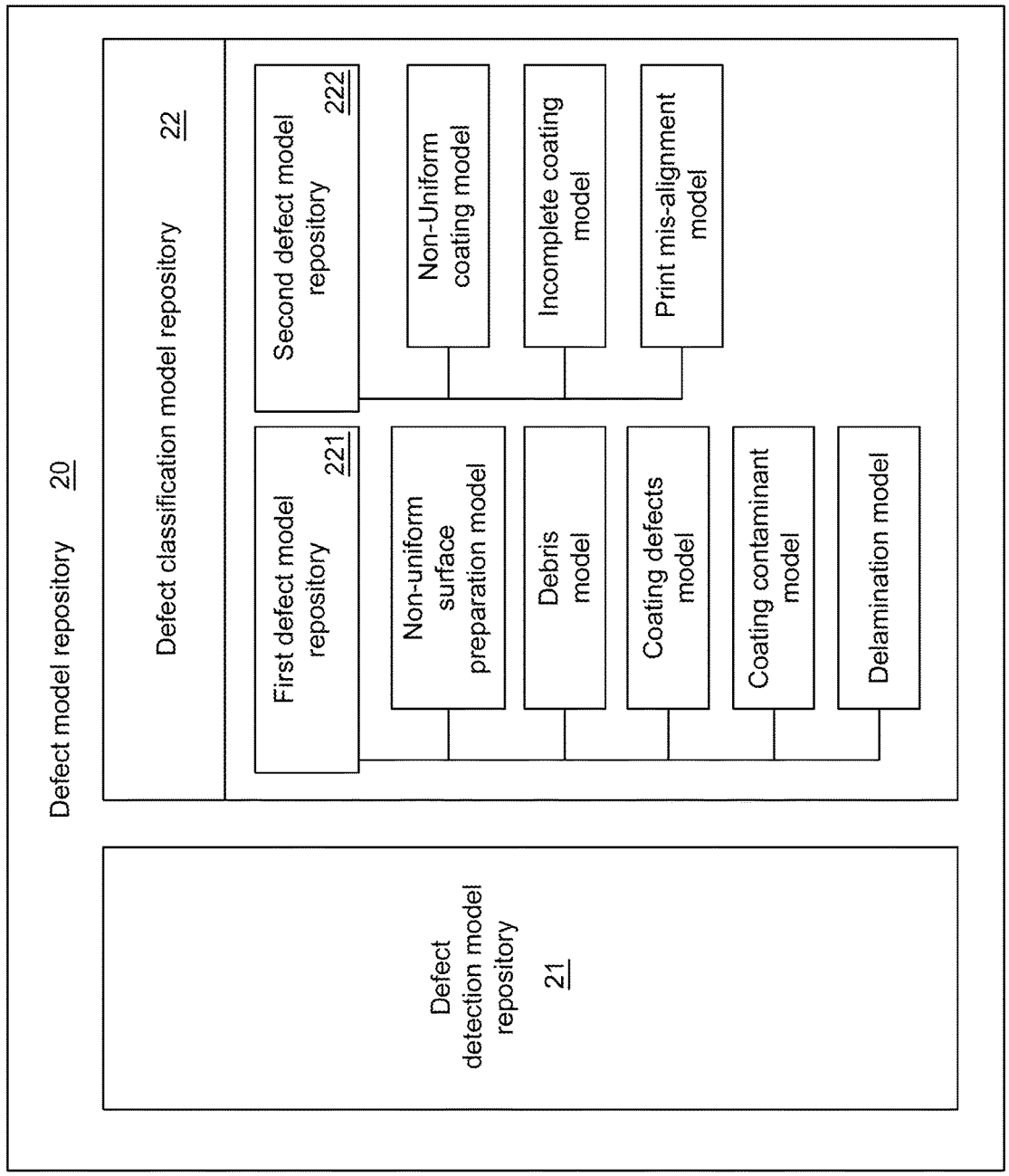
FIG. 15 is a schematic diagram of a defect model repository in the quality monitoring system of FIG. 14.

Under this circumstance, the set of feature vectors generated by the real-time quality control computer 2 may include the first set of feature vectors and the second set of feature vectors above-mentioned. As shown in FIG. 15, the defect classification model repository 22 of the real-time quality control computer 2 in the quality monitoring system 100 may have the first defect model repository 221 and the second defect model repository 222 above-mentioned.

Figure 17:
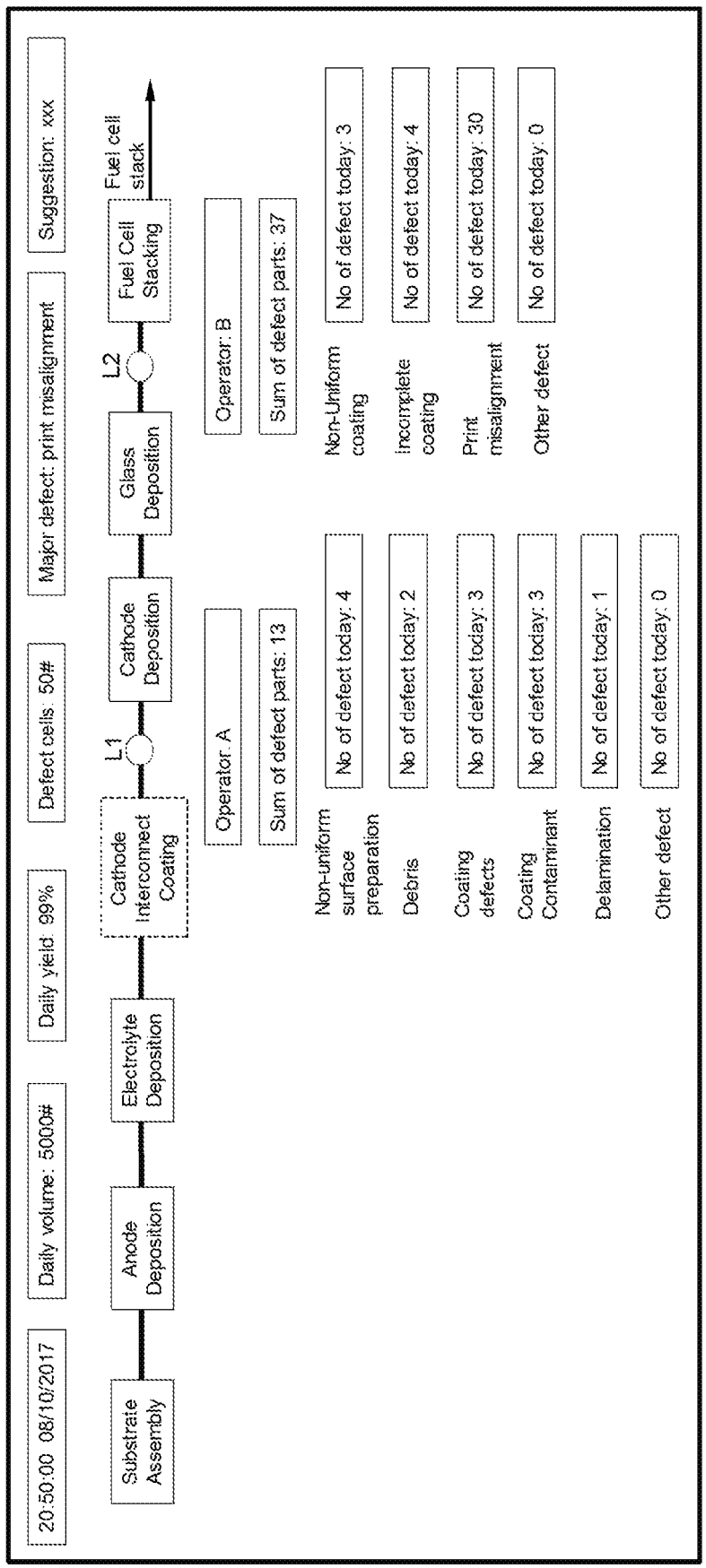
FIG. 17 is a defect summary display on an interactive interface.

FIG. 17 illustrates a defect summary display on the interactive interface 5. Referring to FIG. 17, the interactive interface 5 may include a first alarm device L1 and a second alarm device L2. The first alarm device L1 and the second alarm device L2 may be arranged respectively before the cathode deposition phase P4 and before the fuel cell stacking phase P6. The first alarm device L1 and the second alarm device L2 can be any alert signal to inform the field operator whenever the defect model repository 20 get a significant defect, for example the confidence value of the defect model repository 20 dropping below the threshold, the accumulated number of defective fuel cells confirmed by the field operator reaching the limit, or a combination thereof. The alert signal can be red/amber light, flashing or no flashing. The first alarm device L1 and the second alarm device L2 can also be a buzzer, through which the field operator can hear the alert. The first alarm device L1 and the second alarm device L2 can also be a combination of the alert signal and the buzzer.

The quality monitoring systems of the present disclosure enable the mass production and improve the throughput by eliminating the need for heavy human attention, and may improve the efficiency and production output gain and bring down the operating cost and hence the cost for fuel cells.

Quality Monitoring Method

Figure 18:
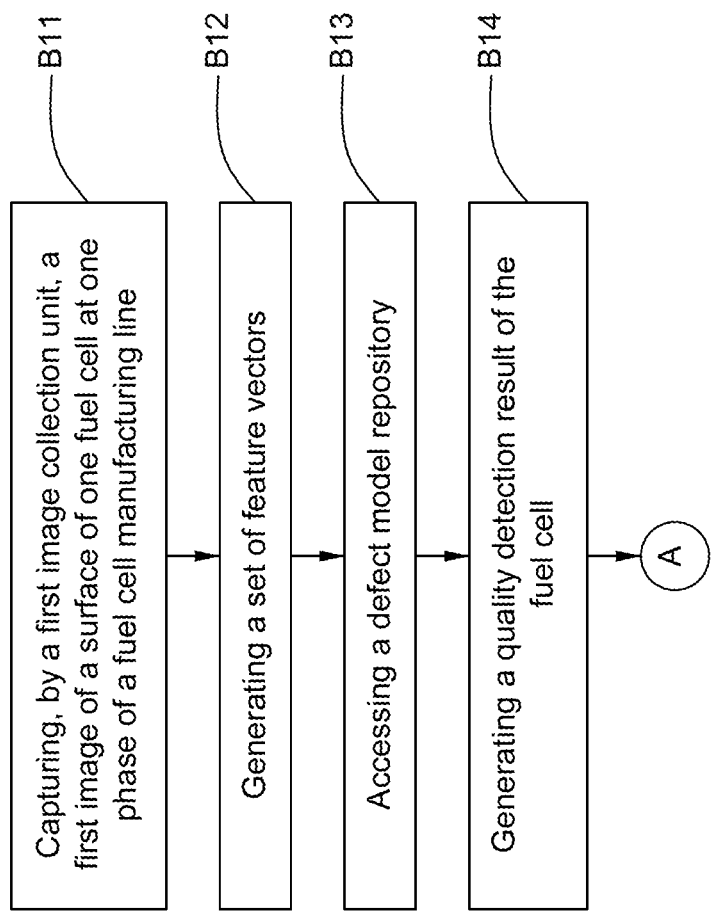
FIG. 18 is a flow chart of a quality monitoring method for a fuel cell manufacturing line in accordance with an embodiment of the present disclosure.

FIG. 18 illustrates a flow chart of a quality monitoring method for a fuel cell manufacturing line in accordance with an embodiment of the present disclosure. The quality monitoring method may include the steps as follows.

As shown in block B11 of FIG. 18, a first image collection unit is positioned at one phase of the fuel cell manufacturing line. For example, the first image collection unit may be positioned before the cathode deposition phase P4. Or the first image collection unit may be positioned before the fuel cell stacking phase P6, preferably after the glass deposition phase P5 and before the fuel cell stacking phase P6. Then, a first image of a surface of one fuel cell at the one phase of the fuel cell manufacturing line is captured by the first image collection unit.

In block B12, a set of feature vectors is generated based on the captured first image.

In block B13, a defect model repository 20 is accessed.

In block B14, a quality detection result of the fuel cell is generated based on the set of feature vectors and the defect model repository 20.

Figure 19:
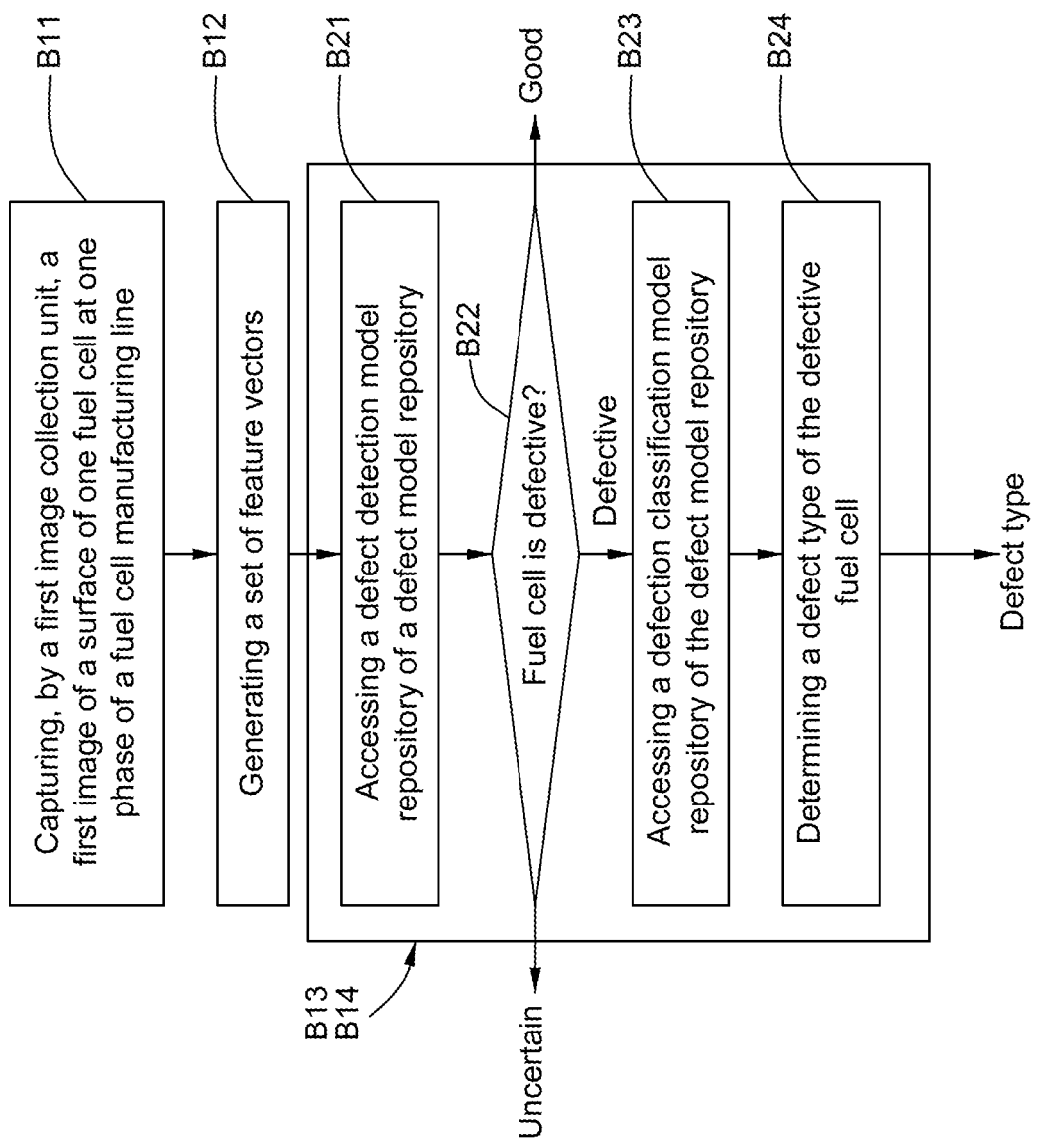
FIG. 19 is a flow chart of a quality monitoring method for a fuel cell manufacturing line in accordance with another embodiment of the present disclosure.

Referring to FIG. 19, in one embodiment, blocks B13 and B14 of accessing the defect model repository 20 and generating the quality detection result of the fuel cell may further include blocks B21-B24.

After block B12, the process goes to block B21. In block B21, a defect detection model repository 21 of the defect model repository 20 is accessed, and then the process goes to block B22.

In block B22, whether the fuel cell is defective is determined based on the set of feature vectors and the defect detection model repository 21. When the fuel cell is determined to be defective, the process goes to block B23.

In block B23, a defect classification model repository 22 of the defect model repository 20 is accessed. Then, the process goes to block B24.

In block B24, a defect type of the defective fuel cell is determined based on the set of feature vectors of the defective fuel cell and the defect classification model repository 22.

Hereinafter, how to control the fuel cell based on the quality detection result of the fuel cell in FIG. 19 will be explained in detail with reference to FIG. 20.

Figure 20:
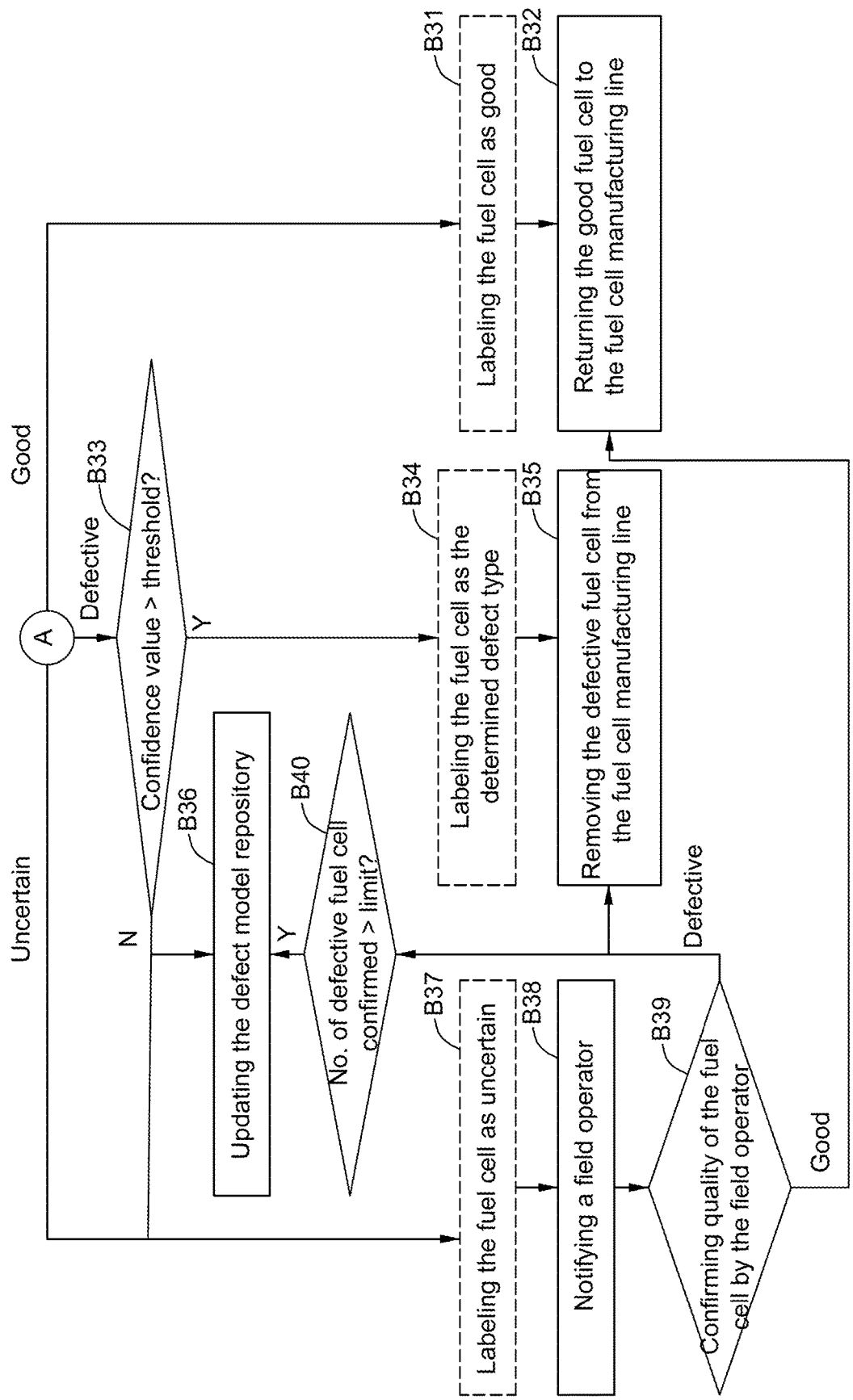
FIG. 20 is a flow chart of a latter part of the quality monitoring method in accordance with an embodiment of the present disclosure.

As shown in FIG. 20, when the fuel cell is determined from the captured first image to be good, the process goes to block B31. In block B31, the fuel cell is labeled as good and then the process goes to block B32. In block B32, the good fuel cell is returned to the fuel cell manufacturing line.

In one embodiment, with continued reference to FIG. 20, when the quality detection result of the fuel cell indicates that the fuel cell is defective, the process continues to block B33. In block B33, it is determined whether a confidence value of the defect model repository 20 is above a threshold. When the confidence value of the defect model repository 20 is above the threshold, the process goes to block B34. In block B34, the defective fuel cell is labeled as the determined defect type and then the process goes to block B35. In block B35, the defective fuel cell is removed from the fuel cell manufacturing line.

In another embodiment, when the quality detection result of the fuel cell indicates that the fuel cell is defective, the process may go directly to block B35 to remove the defective fuel cell from the fuel cell manufacturing line.

When the confidence value of the defect model repository 20 drops below the threshold, the process goes to block B36 and block B37. In block B36, the defect model repository 20 is updated with the set of feature vectors generated.

In block B37, the fuel cell is labeled as uncertain and then the process goes to block B38. In block B38, a field operator is notified and next the process goes to block B39. In block B39, quality of the fuel cell is confirmed by the field operator.

When the quality detection result of the fuel cell indicates that quality of the fuel cell is uncertain, the process also goes to block B37.

When the quality of the fuel cell confirmed by the field operator is good, the process goes to block B32.

The quality monitoring method of the present disclosure may further include block B40. When the quality of the fuel cell confirmed by the field operator is defective, the process continues to block B40. In block B40, it is determined whether the accumulated number of defective fuel cells confirmed by the field operator reaches a limit. When the accumulated number of the defective fuel cells confirmed by the field operator reaches the limit, the process goes to block B36 in which the defect model repository 20 is updated with sets of feature vectors generated from images of the defective fuel cells.

Figure 21:
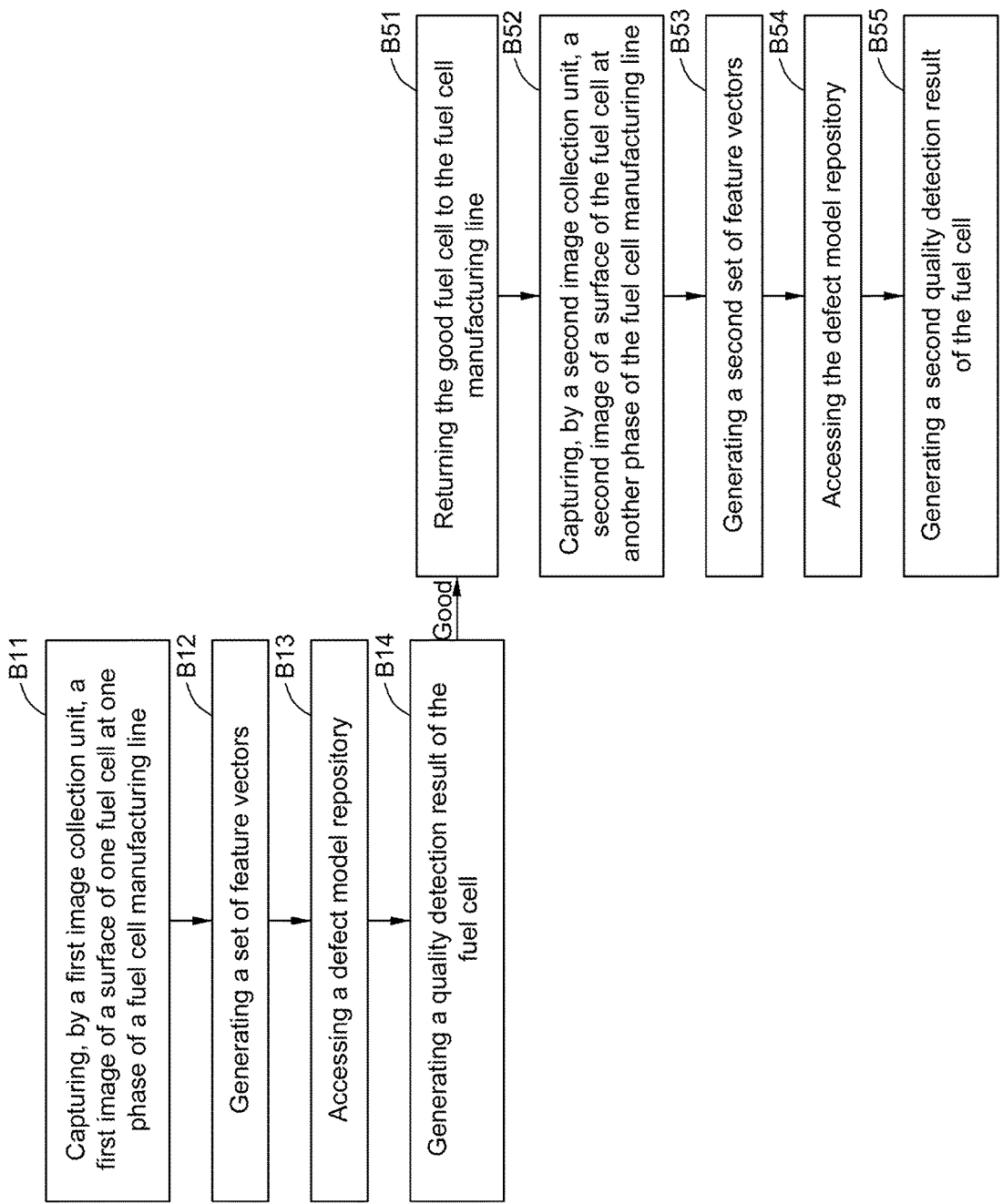
FIG. 21 is a flow chart of a quality monitoring method for a fuel cell manufacturing line in accordance with still another embodiment of the present disclosure.

FIG. 21 illustrates a flow chart of a quality monitoring method for a fuel cell manufacturing line in accordance with another embodiment of the present disclosure. The quality monitoring method may further include blocks B51-B55 besides including blocks B11-B14.

As shown in FIG. 21, after block B14, when the quality detection result indicates the fuel cell is good, the process continues to block B51. In block B51, the good fuel cell is returned to the fuel cell manufacturing line.

In block B52, a second image collection unit is positioned at another phase of the fuel cell manufacturing line and a second image of a surface of the fuel cell at another phase of the fuel cell manufacturing line is captured by the second image collection unit 1. In this embodiment, for example, the first image collection unit may be positioned before the cathode deposition phase P4 and the second image collection unit may be positioned before the fuel cell stacking phase P6, preferably the glass deposition phase P5 and before the fuel cell stacking phase P6.

In block B53, a second set of feature vectors is generated based on the captured second image.

In block B54, the defect model repository 20 is accessed.

In block B55, a second quality detection result of the fuel cell is generated based on the second set of feature vectors and the defect model repository 20.

The quality monitoring method of FIG. 21 may not only realize quality monitoring for the fuel cells at multiple phases of the fuel cell manufacturing line, but also recheck at the later phase for the defects of the fuel cell which cannot be detected at the previous phase, which may reduce detection missing rate.

The quality monitoring method of the present disclosure enables the mass production and improve the throughput by eliminating the need for heavy human attention, and may improve the efficiency and production output gain and brings down the operating cost and hence the cost for fuel cells.

The quality monitoring method and the quality monitoring system of the present disclosure may be not only applied to fuel cell application, but also applied to non-fuel cell application. As a matter of fact, the quality monitoring method and the quality monitoring system of the present disclosure may be used for quality monitoring of a manufactured item which has some visual defects in any manufacturing line.

While steps of the quality monitoring method in accordance with embodiments of the present disclosure are illustrated as functional blocks, the order of the blocks and the separation of the steps among the various blocks shown in FIGS. 18-21 are not intended to be limiting. For example, the blocks may be performed in a different order and a step associated with one block may be combined with one or more other blocks or may be sub-divided into a number of blocks.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A quality monitoring system for a fuel cell manufacturing line, comprising:
    an image collection unit configured to generate a captured image of a surface of one fuel cell in the fuel cell manufacturing line;
    a real-time quality control computer coupled to the image collection unit and configured to receive the captured image and generate a set of feature vectors based on the captured image, wherein the real-time quality control computer comprises:
    a defect model repository comprising a defect detection model repository and a defect classification model repository;
    a defect detection module configured to access the defect detection model repository and determine whether the fuel cell is defective based on the set of feature vectors and the defect detection model repository; and
    a defect classification module configured to access the defect classification model repository when the defect detection module determines the fuel cell is defective and determine a defect type of the defective fuel cell based on the set of feature vectors of the defective fuel cell and the defect classification model repository.

2. The quality monitoring system of claim 1, wherein the defect detection model repository has one or more models to determine whether the fuel cell is defective; and the defect classification model repository has one or more models to determine one or more defect types presented in the fuel cell manufacturing line.

3. The quality monitoring system of claim 2, wherein the fuel cell manufacturing line comprises a substrate assembly phase, an anode deposition phase, an electrolyte deposition phase, a cathode deposition phase, a glass deposition phase and a fuel cell stacking phase, the image collection unit being located before at least one phase of cathode deposition or fuel cell stacking.

4. The quality monitoring system of claim 3, wherein the anode deposition phase and the electrolyte deposition phase use thermal spray technique.

5. The quality monitoring system of claim 3, wherein the substrate assembly phase, the anode deposition phase, the electrolyte deposition phase, the cathode deposition phase, and the glass deposition phase occur in series to result in a finished fuel cell which constructs only one component for adding operating voltage of a fuel cell stack.

6. The quality monitoring system of claim 5, wherein the image collection unit is located after the glass deposition phase and before the fuel cell stacking phase.

7. The quality monitoring system of claim 3, wherein the fuel cell manufacturing line further comprises a cathode interconnect coating phase, and the defect classification model repository has at least one of a first defect model repository or a second defect model repository, the first defect model repository having one or more models to determine one or more defect types presented on a coating deposited at the phases of substrate assembly, electrolyte deposition, or combinations thereof, and the second defect model repository having one or more models to determine one or more defect types presented at the phases of cathode interconnect coating, cathode deposition, glass deposition or combinations thereof.

8. The quality monitoring system of claim 1, wherein the set of feature vectors generated comprises at least one of the following sets:
    a first set of feature vectors associated with one or more of part size, datum positions, flow field alignment, anode coating defects, electrolyte coating defects, color anomalies indicating contamination and uniformity of cathode interconnect coating; and
    a second set of feature vectors associated with one or more of alignment of cathode, alignment of glass seal in reference to part perimeter and manifolds, uniformity of glass seal coverage and uniformity of cathode.

9. The quality monitoring system of claim 1, further comprising:
    a removing unit configured to remove a defective fuel cell from the fuel cell manufacturing line.

10. The quality monitoring system of claim 9, wherein the real-time quality control computer further comprises:
    a confidence determination module configured to determine a confidence value of the defect model repository which are indicative of reliability of the defect model repository, wherein when the confidence value of the defect model repository is above a threshold, the removing unit removes the defective fuel cell from the fuel cell manufacturing line.

11. The quality monitoring system of claim 10, wherein when the confidence value of the defect model repository drops below the threshold, the defect model repository is updated with the set of feature vectors.

12. The quality monitoring system of claim 1, wherein the real-time quality control computer is further configured to learn interactively with a field operator via an interactive interface.

13. The quality monitoring system of claim 12, further comprising a fuel cell database, wherein when the number of defective fuel cells accumulated in the fuel cell database and confirmed by the field operator reaches a limit, the defect model repository is updated with sets of feature vectors generated from images of the defective fuel cells.

14. The quality monitoring system of claim 1, further comprising:
a labeling unit configured to label the fuel cell with a quality detection result of the fuel cell.

15. A quality monitoring method for a fuel cell manufacturing line, comprising:
generating, by a first image collection unit, a captured first image of a surface of one fuel cell in one phase of the fuel cell manufacturing line;
generating a set of feature vectors based on the captured first image; and
accessing a defect model repository and generating a quality detection result of the fuel cell based on the set of feature vectors and the defect model repository, comprising:
accessing a defect detection model repository of the defect model repository;
determining whether the fuel cell is defective based on the set of feature vectors and the defect detection model repository;
when the fuel cell is determined to be defective, accessing a defect classification model repository of the defect model repository; and
determining a defect type of the defective fuel cell based on the set of feature vectors of the defective fuel cell and the defect classification model repository.

16. The quality monitoring method of claim 15, wherein the quality monitoring method is used for the fuel cell manufacturing line comprising a substrate assembly phase, an anode deposition phase, an electrolyte deposition phase, a cathode deposition phase, a glass deposition phase and a fuel cell stacking phase.

17. The quality monitoring method of claim 16, wherein the first image collection unit is positioned before at least one phase of cathode deposition or fuel cell stacking.

18. The quality monitoring method of claim 16, wherein a finished fuel cell which constructs only one component for adding operating voltage of a fuel cell stack is sequentially manufactured through the substrate assembly phase, the anode deposition phase, the electrolyte deposition phase, the cathode deposition phase, and the glass deposition phase occurring in series.

19. The quality monitoring method of claim 18, wherein the first image collection unit is located after the glass deposition phase and before the fuel cell stacking phase and the quality monitoring method is configured for monitoring quality of the finished fuel cell.

20. The quality monitoring method of claim 15, further comprising:
when the fuel cell is determined from the captured first image to be good, returning the fuel cell to the fuel cell manufacturing line;
generating, by a second image collection unit, a captured second image of a surface of the fuel cell in another phase of the fuel cell manufacturing line;
generating a second set of feature vectors based on the captured second image; and
accessing the defect model repository and generating a second quality detection result of the fuel cell based on the second set of feature vectors and the defect model repository.

21. The quality monitoring method of claim 20, wherein the fuel cell manufacturing line comprises a substrate assembly phase, an anode deposition phase, an electrolyte deposition phase, a cathode deposition phase, a glass deposition phase and a fuel cell stacking phase occurring in series, and wherein the first image collection unit is located before cathode deposition phase, and the second image collection unit is located after the glass deposition phase and before the fuel cell stacking phase.

22. The quality monitoring method of claim 15, further comprising:
when the quality detection result of the fuel cell indicates that the fuel cell is defective, removing the defective fuel cell from the fuel cell manufacturing line.

23. The quality monitoring method of claim 22, further comprising:
determining whether a confidence value of the defect model repository is above a threshold, wherein when the confidence value of the defect model repository is above the threshold, the defective fuel cell is removed from the fuel cell manufacturing line.

24. The quality monitoring method of claim 23, further comprising:
updating the defect model repository with the set of feature vectors when the confidence value of the defect model repository drops below the threshold.

25. The quality monitoring method of claim 23, further comprising:
when the confidence value of the defect model repository drops below the threshold, notifying a field operator and confirming quality of the fuel cell by the field operator.

26. The quality monitoring method of claim 25, further comprising:
updating the defect model repository with sets of feature vectors generated from images of the defective fuel cells when the number of accumulated defective fuel cells confirmed by the field operator reaches a limit.

27. A quality monitoring system for a manufacturing line, comprising:
an image collection unit configured to generate a captured image of a surface of a manufactured item in the manufacturing line;
a real-time quality control computer coupled to the image collection unit and configured to receive the captured image and generate a set of feature vectors based on the captured image, wherein the real-time quality control computer comprises:
a defect model repository comprising a defect detection model repository and a defect classification model repository;
a defect detection module configured to access the defect detection model repository and determine whether the manufactured item is defective based on the set of feature vectors and the defect detection model repository; and a defect classification module configured to access the defect classification model repository when the defect detection module determines the manufactured item is defective and determine a defect type of the manufactured item based on the set of feature vectors of the manufactured item and the defect classification model repository.

* * * * *